United States Patent Office 3,380,979
Patented Apr. 30, 1968

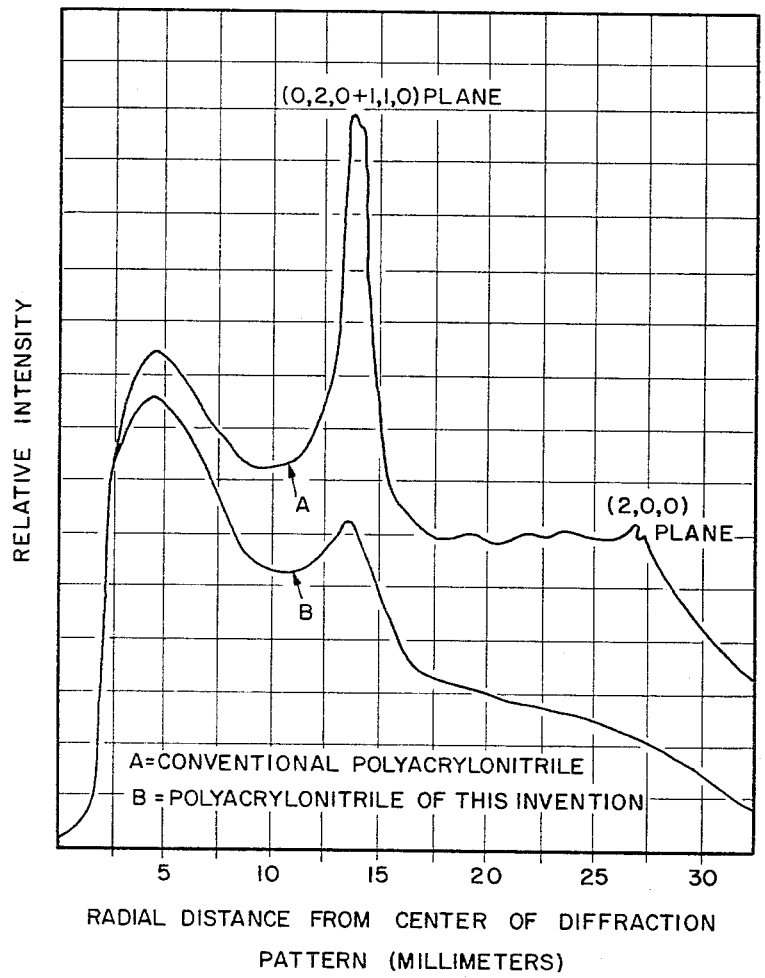

3,380,979
NOVEL PROCESS AND POLYMER
Robert Chiang, Durham, N.C., assignor to Monsanto Company, a corporation of Delaware
Continuation-in-part of application Ser. No. 163,163, Dec. 21, 1961. This application Sept. 30, 1964, Ser. No. 400,599
3 Claims. (Cl. 260—88.7)

This invention is a continuation-in-part of now abandoned application Ser. No. 163,163 filed Dec. 21, 1961.

This invention relates to a new method for polymerizing acrylonitrile in the presence of coordinate complex polymerization initiators and to the novel polyacrylonitrile products obtained thereby.

Although conventional acrylonitrile polymers, i.e., obtained by free-radical catalysts, have found wide application in the fabrication of end-products, unlike certain other polymeric materials, for example, nylon, they have not to date been suitable for use in molding or extrusion processes for forming shaped articles. The reason for this is that conventional, unmodified polyacrylonitrile prepared through free-radical induced polymerization does not acquire adequate thermoplastic properties as a practical matter even when heated to above temperatures at which coloration and decomposition occurs. Thus, it is apparent that conventional polyacrylonitrile as obtained by free-radical catalysis is not amenable to use in molding or extrusion processes.

It is, therefore, a principal object of this invention to provide novel acrylonitrile polymers with improved thermoplastic properties suitable for use in molding and extrusion processes.

It is a further object to provide a novel method for preparing the acrylonitrile polymers of this invention.

Other objects of this invention will become apparent as the following discussion thereof proceeds.

Broadly, these objects are achieved by conducting a solution polymerization of acrylonitrile in the presence of a coordinate complex organometallic catalyst or initiators represented by the following formula:

$$M[AlR_4]_x$$

wherein M is an alkali or an alkaline earth metal, R is an alkyl radical having from 1 to 12 carbon atoms and X is an integer of 1 or 2 which corresponds to the valence of M. The lower alkyl radicals having from 1 to 6 carbon atoms are generally preferred.

The initiators per se are generally known in the art and may be prepared by contacting a dispersion of an alkali metal or an alkaline earth metal in a suitable inert liquid medium, such as toluene or hexane, with an aluminum trialkyl.

The catalysts of this invention may also be prepared by the reaction of a molar excess of an aluminum trialkyl with an alkali metal or alkaline earth metal alkoxide and then recrystallizing the crystal product, care being taken to exclude oxygen or moisture.

The initiators of this invention are included among compounds such as sodium aluminum tetraethyl

(NaAlEt$_4$)

lithium aluminum tetraethyl (LiAlEt$_4$) and calcium dialuminum tetraethyl (Ca[AlEt$_4$]$_2$).

As previously noted, the polymerization procedures contemplated in this invention are carried out in solution. The liquid vehicle employed should be anhydrous and inert to the monomer. Any of the many known solvents which meet these requirements and are commonly employed in conducting acrylonitrile polymerizations may be suitably employed. Among the most familiar are dimethyl formamide, dimethyl sulfoxide and dimethyl acetamide, with dimethyl formamide being generally preferred. The quantity of catalyst needed to initiate the reaction is not critical, it being necessary only that a catalytic amount be present, say from about 0.1 to 5 percent based on the weight of the monomer.

The polymerization should be carried out under anhydrous conditions and in an inert atmosphere which can be effected, for example, by blanketing the reaction zone with gaseous nitrogen. The polymerization may be conducted with temperatures in the range of from 0° to 100° C., with temperatures of from 25° to 50° C. generally being preferred. Polymerization can be carried out at atmospheric pressures or even lower pressures, although in some instances it may be desirable to use supratmospheric pressures in order to increase the monomer concentration in contact with the catalyst. Depending upon the temperatures employed, pressure, catalyst concentration, etc., the reaction time will vary over a period of one hour or more. Following the completion of the reaction, the polymer may be recovered by precipitation in methanol, for example. Polymers can be prepared with molecular weights in the fiber-forming range, i.e., in excess of 10,000.

In order to illustrate the invention with greater particularity, the following specific example is given, it being understood that the example is presented merely for illustrative purposes.

Example

In a reaction bottle filled with gaseous nitrogen and containing 10 cc. of benzene, there was introduced 0.34 gm. of sodium ethoxide (0.005 mole) and 4 cc. of 25 percent solution of aluminum triethyl in heptane (0.0065 mole of aluminum triethyl). Reaction took place and was completed instantaneously. The resulting reaction mixture was permitted to stand for approximately 12 hours during which time fine needle-like crystals of sodium aluminum tetraethyl (NaAlEt$_4$) about ½ inch in length precipitated out of solution. These crystals were recovered by decantation and thereafter recrystallized twice in benzene to remove impurities.

To the sodium aluminum tetraethyl, as prepared above, there was added 50 cc. of dry dimethyl formamide, followed by the further addition of 10 cc. (8.0 gm.) of acrylonitrile. Polymerization was carried out in an inert atmosphere and at 50° C. After three hours, the reaction was stopped by adding 5 cc. of dilute hydrochloric acid to the reaction mixture. The polymer was recovered by precipitation in methanol. The polymer was then washed with dilute hydrochloric acid, water and methanol and thereafter dried under vacuum. The calculated conversion was 95 percent with the polymer having a molecular weight of 65,000 and a density at 25° C. of 1.175. The polymer was not discolored being pure white in appearance. Chemical analysis gave the following results in percent by weight: carbon 66.04; hydrogen 5.60; and nitrogen 26.54. This compares with the calculated weight percent composition of polyacrylonitrile, which is: carbon 67.88; hydrogen 5.70; and nitrogen 26.41.

In order to ascertain the suitability of the polyacrylonitrile product of this invention for molding processes, transparent pellets of ⅛ inch thickness were molded therefrom. It was found that sufficient fluidity could be obtained for accomplishing this by heating the polymer to a temperature which did not exceed 200° F. This is in marked contrast to a temperature in excess of 275° F., which is required in the instance of polyacrylonitrile as obtained by conventional free-radical catalysts.

Various solubility determinations were made on the polymers of this invention and compared with those of conventional polyacrylonitrile, i.e., as obtained by free-radical catalysts. It was found that the polymers of this invention can be dissolved in propylene carbonate at temperatures in the range of from 35° to 60° C. in a very dilute solution, i.e., less than a one percent concentration of polymer, whereas, temperatures in the range of from 125° to 130° C. are required in the instance of conventional polyacrylonitrile under the same conditions.

It was also found that the polymers of this invention will not crystallize from a 50 percent solution of succinonitrile at 50° C. whereas conventional polyacrylonitrile crystallizes at 70° C. from a similar solution of the same solvent.

The polymers, as described herein, were also tested to determine their solubility if any in acetone, and were found not to be soluble therein.

The differences in physical properties, as noted above, between the acrylonitrile polymers of this invention and polyacrylonitrile as obtained by conventional free-radical polymerization were believed to result from differences in their molecular configurations. In order to verify this, X-ray analyses were made on the two polymers. This was done by first taking flat plate diffraction patterns of the polymers with Ni filtered Cu-$K_\alpha$ X-rays. These patterns were then microphotometered along the diameter of the rings.

Reference is made to the accompanying graph wherein the X-ray diffraction patterns of the two polymers are plotted together. As is noted, the curve labeled A represents the pattern obtained by conventional polyacrylonitrile, i.e., a polymer obtained by free-radical polymerization. The curve labeled B represents the pattern obtained with a polymer prepared by the novel polymerization in accordance with this invention. These curves or patterns are obtained by plotting the relative intensity (the fraction of light absorbed by the photographic negative of the X-ray diffraction pattern) against the radial distance from the center of the diffraction pattern (i.e., the distance in millimeters from the primary X-rays beam). It is seen that the polymer of this invention (B) has a considerably more diffuse or random configuration than that of conventional polyacrylonitrile (A). This is brought out by the sharpness of the reflection (term used in the Bragg sense) in the (0, 2, 0) plane and the appearance of the reflection in the (2, 0, 0) plane. These differences are indicative of considerably greater lateral order in polymer (A) i.e., the polymer obtained by conventional free-radical polymerization.

As many different embodiments may be made without departing from the scope and spirit of my invention, it is to be understood that the invention is in no way restricted safe as set forth in the appended claims. For example, the process may be used to form copolymers of acrylonitrile with small amounts of other monomers such as vinyl acetate, vinyl chloride and the like.

I claim:

1. A method for producing polyacrylonitrile with improved thermoplastic properties which comprises reacting acrylonitrile in an inert medium at a temperature in the range of from 0° to 100° C. in the presence of a catalytic amount of a coordinate complex catalyst represented by the formula $M[AlR_4]_x$ wherein M represents a metal selected from the group consisting of alkali and alkaline earth metals, R represents a lower alkyl radical and $x$ is an integer which is equal to the valence of M.

2. A method for producing polyacrylonitrile with improved thermoplastic properties which comprises reacting acrylonitrile in an inert medium at a temperature in the range of from 0° to 100° C. in the presence of a catalytic amount of a coordinate complex catalyst represented by the formula $NaAlR_4$ wherein R represents a lower alkyl radical.

3. The method of claim 2 wherein the coordinate complex catalyst is sodium aluminum tetraethyl.

References Cited

UNITED STATES PATENTS

| | | | | |
|---|---|---|---|---|
| 2,910,461 | 10/1959 | Nowlin et al. | | |
| 3,069,402 | 12/1962 | Smart | 260— | 88.7 |
| 3,088,939 | 5/1963 | Miller | 260— | 88.7 |
| 3,100,761 | 8/1963 | Fellman | 260— | 88.7 |
| 2,649,427 | 8/1953 | Marvel | 260— | 88.7 |

OTHER REFERENCES

Zilkha et al.: Chem. Abs., vol 53 (1959), p. 5731b.

JOSEPH L. SCHOFER, *Primary Examiner.*

H. WONG, *Assistant Examiner.*